United States Patent Office 2,716,615
Patented Aug. 30, 1955

2,716,615

A DRY FILM COMPOSED OF CARBOXYMETHYL CELLULOSE AND DIPROPYLENE GLYCOL

Robert S. Voris, Wilmington, Del., assignor to Hercules Powder Company, Wilmington, Del., a corporation of Delaware No Drawing. Application April 6, 1951,
Serial No. 219,757

1 Claim. (Cl. 106—189)

The object of this invention is a dry film composed of the free acid form of carboxymethyl cellulose and dipropylene glycol.

There are a number of commercial applications where it is desirable to lay down a deposit, coating or film from a water system, and obtain a deposit, coating or film upon evaporation of the water which is then substantially insoluble in water, and yet which can subsequently be removed readily by treatment with aqueous alkali solutions if desired. Heretofore, attempts to prepare compositions having these characteristics have been deficient and uneconomical. It is known, for example, that a coating or film of sodium carboxymethylcellulose can be insolubilized after deposition from a water solution by surface treatment of the coating or film with a salt solution such as aluminum sulfate, or by surface treatment with a strong acid such as hydrochloric or sulfuric acid. Due to the dense nature of the deposited coating or film, such insolubilization treatment is necessarily confined to a very thin surface layer and does not extend uniformly throughout the deposited coating or film. Such films are rather water sensitive and tend to disintegrate in water. Moreover, such films are contaminated with salt impurities which cannot be satisfactorily removed by washing treatments. Furthermore, there has been no known means whereby compositions, coatings or films of the free acid form of carboxyalkyl cellulose ethers can be uniformly plasticized, and unless uniformly plasticized such coatings or films tend to be brittle.

Now in accordance with this invention compositions are prepared comprising the free acid form of carboxyalkyl cellulose ethers and a water-miscible plasticizer therefor distributed uniformly therethrough. The plasticized free acid carboxyalkyl cellulose ether compositions of this invention are characterized by a very high degree of flexibility in comparison to unplasticized compositions of free acid carboxyalkyl cellulose ethers. These plasticized compositions are insoluble in organic solvents, organic and inorganic acids, greases, vegetable, animal, and mineral oils, and aqueous salt solutions. They are soluble in aqueous caustic alkali solutions containing 0.5% caustic alkali, and in aqueous solutions of ammonia (5%), borax (4%), and sodium carbonate (5%). Free films or pellicles of the plasticized compositions of this invention are prepared which are very pliable and of good strength, being comparable in these respects to suitably plasticized free films of the water-soluble salts of the carboxyalkyl cellulose ethers. Preferred compositions in accordance with this invention are substantially water insoluble and contain up to about 1 part of plasticizer for each part by weight of free acid carboxyalkyl cellulose ether.

In a particular embodiment of this invention, the free acid form of carboxymethylcellulose substantially free of contaminating salt impurities is plasticized with dipropylene glycol alone or in conjunction with other plasticizers to form very useful plasticized compositions suitable for many applications, and particularly for the preparation of free films or pellicles. This is surprising in view of the fact that dipropylene glycol is incompatible with sodium carboxymethylcellulose, and tends to exude from the film under certain conditions.

The invention is illustrated by the following specific embodiments thereof but these are not to be construed as limiting the invention.

EXAMPLE 1

This example illustrates a suitable method for the preparation of the free acid form of a carboxyalkyl cellulose ether substantially free of contaminating salt impurities in a form suitable for the purposes of this invention. In this example a solution of a water-soluble salt of a carboxyalkyl cellulose ether is contacted with a suitable cation exchange resin in the acid form to effect an exchange of ions. Essentially all of the cations present in the aqueous colloidal solution of water-soluble salt of carboxyalkyl cellulose ether become attached to the cation exchange resin and hydrogen ions supplied by the free acid form of the cation exchange resin become attached to the carboxyalkyl cellulose ether to form in situ the free acid form of such ether. The free acid form of carboxyalkyl cellulose ether thus obtained remains colloidally dispersed to form a uniform, stable, aqueous colloidal dispersion, and it does not separate or precipitate from the colloidal dispersion upon standing.

A glass column 4 feet tall with an inside diameter of 1¾ inches, with suitable connections at both top and bottom to permit introducing water or solutions into the column in either direction, fitted at the lower end with a 20-mesh stainless steel screen, was filled to a depth of about 2 inches with standard Ottawa sand which rested on the screen. The column was filled about half full of water, and 685 g. of Amberlite IR–120 resin (water saturated, as supplied by the manufacturer) was added to the column. The height of the settled resin bed was 18 inches. The resin bed was backwashed (upflow) for 10 minutes with water at such a rate that the bed expanded to a height of about 27 inches. That is, the water flow rate was such as to hold the resin in a semisuspended condition so that it occupied an expanded depth of 27 inches instead of the 18 inches occupied by the settled resin. Backwashing was stopped, the resin was allowed to settle, and water was drained out of the column until its level was barely above the top of the resin bed.

Eight kg. of 5% aqueous sulfuric acid was then passed downwardly through the resin bed at the rate of 150 ml. per minute. The resin bed was then rinsed with water, flowing downwardly through the column at the rate of 150 ml. per minute, until the effluent from the bottom of the column was free of sulfate, as shown by absence of a precipitate upon addition of barium chloride solution and heating to boiling.

A 2% by weight water solution of a purified commercial grade of sodium carboxymethylcellulose, designated as Hercules CMC–70L, was prepared employing distilled water. This sodium carboxymethylcellulose had a degree of substitution of 0.76 carboxymethyl group for each anhydroglucose unit in the cellulose.

Thirteen liters of this 2% aqueous solution of sodium carboxymethylcellulose was passed upwardly through the resin bed in the column at a rate of 50–75 ml. per minute. At this rate of flow the resin bed was expanded or held in a semisuspended condition so that it occupied an expanded depth of between 33 and 37 inches as compared to 18 inches for the settled resin bed. The effluent from the column was passed through a fine screen situated in the effluent line to trap any entrained cation exchange resin.

The effluent obtained was a smooth, homogeneous, stable, colloidal dispersion comprising substantially pure water and the free acid form of carboxymethylcellulose colloidally dispersed therein, and being substantially free of contaminating salt impurities. Analysis indicated a 97 to 98% conversion of the sodium salt to free acid.

The Amberlite IR-120 resin is a styrene divinylbenzene copolymer having sulfonate groups substituted on the nucleus and is a cation exchange resin manufactured by Rohm and Haas Company, Philadelphia, Pennsylvania. The resin is supplied by the manufacturer in the form of tiny beads or spheres of the sodium form of the resin saturated with water (35 to 45% moisture) and must be regenerated with a strong mineral acid in order to obtain the acid form of the resin.

EXAMPLE 2

To a weighed portion of the aqueous colloidal dispersion of free acid carboxymethylcellulose prepared in Example 1 was added sufficient dipropylene glycol so that the ratio of free acid carboxymethylcellulose to dipropylene glycol plasticizer was 1:1 by weight, and the plasticizer was homogeneously mixed with the colloidal dispersion of free acid carboxymethylcellulose. The plasticized aqueous dispersion was then cast on a glass plate and allowed to evaporate to dryness to form an air-dry film 0.5 mil in thickness. This air-dry film was substantially insoluble in water. Although softened somewhat, the film remained intact upon immersion in water. This plasticized film readily dissolved when treated with 0.5% aqueous sodium hydroxide. It also dissolved although more slowly in 5% aqueous ammonia solution, in 4% aqueous borax solution, and in 5% aqueous sodium carbonate solution.

A similar weighed portion of the aqueous colloidal dispersion of free acid carboxymethylcellulose prepared in Example 1, but without addition of any plasticizer, was cast on a glass plate and allowed to evaporate to dryness to form an unplasticized film 0.5 mil in thickness.

Samples of the plasticized and unplasticized films were conditioned at 77° F. and 50% relative humidity until equilibrium moisture conditions were attained, after which they were examined for tensile strength, elongation and flexibility. Results appear in Table 1 following.

Table 1.—*Strength and flexibility properties of plasticized and unplasticized free acid carboxymethylcellulose films*

| Plasticizer, Percent by Weight Based on Total Film Weight | Tensile Strength, Lb./Sq. In. | Percent Elongation | Flexibility,* Double Folds |
| --- | --- | --- | --- |
| 0 | 7,100 | 2.7 | 320 |
| 50% dipropylene glycol | 6,300 | 7 | 2,460 |

*Determined with Massachusetts Institute of Technology Flex Tester (MIT Flex Tester).

EXAMPLE 3

Table 2 following sets forth the tensile strength, elongation and flexibility of a series of films of free acid carboxymethylcellulose plasticized with glycerin in comparison to unplasticized film of free acid carboxymethylcellulose. These films were prepared from the aqueous colloidal dispersion of free acid carboxymethylcellulose obtained in Example 1, following the procedure set forth in Example 2.

Table 2.—*Strength and flexibility properties of plasticized and unplasticized free acid carboxymethylcellulose films.*

| Plasticizer, Percent by Weight Based on Total Film Weight | Tensile Strength, Lb./Sq. In. | Percent Elongation | Flexibility, Double Folds MIT Flex Tester |
| --- | --- | --- | --- |
| 0 | 7,100 | 2.7 | 320. |
| 9% glycerin | 6,000 | 2.3 | 10,000+. |
| 17% glycerin | 5,000 | 3.0 | 10,000+. |
| 50% glycerin | 2,600 | 45.0 | too soft to test. |

EXAMPLE 4

Approximately 3000 ml. of a 1% by weight aqueous solution of sodium hydroxyethyl carboxymethylcellulose was prepared employing distilled water. This sodium hydroxyethyl carboxymethylcellulose had a hydroxyethyl substitution of 0.25 and a carboxymethyl substitution of 0.42 for each anhydroglucose unit in the cellulose. This solution was passed downwardly through a 12-inch bed (125 g.) of Amberlite IR-120 resin in the acid form at the rate of approximately 1000 ml. per hour.

The effluent obtained was a smooth, homogeneous, stable, colloidal dispersion comprising substantially pure water and the free acid form of hydroxyethyl carboxymethylcellulose colloidally dispersed therein, and being substantially free of contaminating salt impurities. Analysis indicated substantially complete conversion of the sodium salt to the free acid.

Sufficient dipropylene glycol was added to a weighed portion of the aqueous colloidal dispersion of free acid hydroxyethyl carboxymethylcellulose so that the ratio of free acid hydroxyethyl carboxymethylcellulose to dipropylene glycol was 74:26 by weight. A second portion was prepared to contain a ratio of 60 free acid hydroxyethyl carboxymethylcellulose to 40 dipropylene glycol by weight. After mixing to distribute the plasticizer homogeneously, these plasticized aqueous dispersions were cast on glass plates and evaporated to dryness to obtain air-dried films which were then stripped from the supports. These plasticized films were markedly more flexible than a similar film of unplasticized free acid hydroxyethyl carboxymethylcellulose. Both plasticized films were insoluble in water, the one containing 40% dipropylene glycol being softened somewhat but remaining intact.

The free acid form of any carboxyalkyl cellulose ether is suitable for the purposes of this invention and includes by way of example the free acid form of carboxymethylcellulose, carboxyethyl cellulose, carboxypropyl cellulose, hydroxyethyl carboxymethylcellulose, hydroxyethyl carboxyethyl cellulose, hydroxypropyl carboxymethylcellulose, methyl carboxymethylcellulose, and the like. It is apparent, therefore, that this invention contemplates the free acid form of any cellulose ether containing a carboxyalkyl substituent and includes both single ethers and mixed ethers. The free acid form of carboxyalkyl cellulose ethers for the purposes of this invention are derived from the water-soluble salts of the carboxyalkyl cellulose ethers such as the sodium, potassium, lithium, ammonium, magnesium, quaternary ammonium, and amine salts. It is apparent therefore that the degree of substitution in the cellulose ether must be sufficiently high to impart water solubility to the salts thereof. In general, at least about 0.5 total substituent group, of which at least about 0.4 is carboxyalkyl, per anhydroglucose unit in the cellulose is required to confer water solubility to the alkali metal salts and the other salts of carboxyalkyl cellulose ethers set forth above. Any viscosity type of carboxyalkyl cellulose ether is suitable.

In those cases where a plasticized composition substantially insoluble in water is desired, a carboxyalkyl cellulose ether which in the free acid form is substantially insoluble in water is selected, and it is well known to those skilled in the art that there are numerous cellulose ethers available which in the free acid form are insoluble in water. The free acid form of carboxymethylcellulose and of hydroxyethyl carboxymethylcellulose set forth in the examples illustrate such ethers.

For many purposes a plasticized free acid carboxyalkyl cellulose ether composition substantially free of contaminating salt impurities is desirable. Derivation of the free acid form of carboxyalkyl cellulose ether by an ion exchange mechanism as set forth in the examples is particularly effective for accomplishing this.

Any water-miscible plasticizer is suitable in accordance with this invention. These include by way of example any of the polyhydric alcohols such as ethylene glycol, propylene glycol, diethylene glycol, triethylene glycol, polyethylene glycol, dipropylene glycol, tripropylene glycol, polypropylene glycol, glycerin, pentaerythritol, and the like; water-miscible sulfonated oils such as sulfonated castor oil, Turkey-red oil, sulfonated cottonseed oil, sulfonated corn oil, sulfonated neat's-foot oil, sulfonated fish oil, and the like; various water-miscible sulfones such as ethyl sulfone, propyl sulfone, butadiene sulfone, isoprene sulfone, cyclotetramethylene sulfone, and the 3 methyl-, 3 alkoxy-, and 3 methyl, 4 alkoxy derivatives of cyclotetramethylene sulfone having 1 to 8 carbon atoms in the alkoxy groups; invert sugar, mannitol, sorbitol, monacetin, triethyl phosphate, urea, formamide, and the like. These readily mix homogeneously with aqueous colloidal dispersions of free acid carboxyalkyl cellulose ethers, and upon evaporation of the water are homogeneously and uniformly distributed through and mixed with the free acid carboxyalkyl cellulose ether.

When clear deposits or films are desired, a plasticizer is selected which is compatible with the free acid carboxyalkyl cellulose ether. Dipropylene glycol and glycerin are typical of compatible-type plasticizers. Compatibility, however, is not a necessary criterion of a useful plasticizer in accordance with this invention, for many substances which impart a haze or translucent appearance to a film nevertheless operate to impart desirable flexibility to the film, and there are many applications where haze or translucency in the film is entirely inconsequential and unimportant.

It will be apparent to those skilled in the art that the amount of plasticizer employed will embrace a wide range of proportions depending upon the properties desired in the composition. For example, as little as 1 or 2% based on the combined weight of plasticizer and free acid carboxyalkyl cellulose ether is employed when only a slight flexibilizing effect is desired, and flexibility and extensibility increase with increasing amount of plasticizer. Ordinarily plasticizer is employed in effective or plasticizing amounts up to about 50% or even higher percentages based on the combined weight of plasticizer and free acid carboxyalkyl cellulose ether. When compositions substantially insoluble in water are desired, the amount of plasticizer employed will not exceed about 50% by weight based on the combined weights of plasticizer and free acid carboxyalkyl cellulose ether. The plasticizer employed may be a single or individual plasticizing agent, or may be a mixture of two or more plasticizing agents, as desired.

Various auxiliary modifying agents such as dyes, pigments, fillers, water-miscible waxes and resins, and the like may be employed, as desired, depending upon the use to which the plasticized compositions of this invention are to be put.

The plasticized free acid carboxyalkyl cellulose ether compositions prepared in accordance with this invention are particularly valuable in applications where it is desirable to lay down a deposit, coating or film from a water system, and obtain a deposit, coating or film which upon evaporation of the water is then substantially insoluble in water. These compositions are useful for the preparation of printing pastes, inks, shoe polishes, water glues, adhesives, paints, emulsions, and the like. They find application in the recovery and utilization of various dustlike or fine-grained industrial products including comestibles, by impingement of the granular or dustlike particles on a wet film of the composition and upon evaporation of the water the residual plasticized free acid carboxyalkyl cellulose ether composition serves to bind the particles together. They are useful as protective coatings or films which can subsequently be removed readily by treatment with aqueous alkali solutions as, for example, temporary protective coatings for photographic film or for decontamination purposes. They are useful for the preparation of paper sizes, pigment binding agents, greaseproof protective coatings for paper, chipboard, box wood and insulates, wood sealers, permanent sizing agents for textiles, synthetic fibers, free films, leather coatings, and the like.

What I claim and desire to protect by Letters Patent is:

As a new composition of matter, a substantially dry film consisting essentially of the free acid form of carboxymethylcellulose having at least about 0.5 carboxymethyl substituent group per anhydroglucose unit in the cellulose, and a plasticizing amount up to equal proportions by weight based on said carboxymethylcellulose of dipropylene glycol distributed uniformly therethrough and compatible therewith, said film characterized by being insoluble in water and in organic solvents.

References Cited in the file of this patent

UNITED STATES PATENTS

| | | |
|---|---|---|
| 1,884,629 | Dreyfus | Oct. 25, 1932 |
| 1,899,420 | Lawrence | Feb. 28, 1933 |
| 1,994,597 | Stand et al. | Mar. 19, 1935 |
| 2,067,946 | Picton | Jan. 19, 1937 |
| 2,108,810 | Finzel et al. | Feb. 22, 1938 |
| 2,170,828 | Meigs | Aug. 29, 1939 |
| 2,321,316 | Peterson et al. | June 8, 1943 |
| 2,476,331 | Swinehart | July 19, 1949 |
| 2,617,800 | Bergman | Nov. 11, 1952 |
| 2,618,632 | Krug | Nov. 18, 1952 |
| 2,653,108 | Oakley | Sept. 22, 1953 |

OTHER REFERENCES

Davidson, "Ind. & Eng. Chem. 18, pages 669–671.